United States Patent
Brohm et al.

[11] Patent Number: 6,146,783
[45] Date of Patent: Nov. 14, 2000

[54] MULTI-CELL STORAGE BATTERY

[75] Inventors: Thomas Brohm, Hattersheim; Friedhelm Böttcher, Kelkheim, both of Germany

[73] Assignee: Varta Batterie Aktiengesellschaft, Hannover, Germany

[21] Appl. No.: 09/082,653

[22] Filed: May 21, 1998

[30] Foreign Application Priority Data

May 22, 1997 [DE] Germany ............... 197 21 348

[51] Int. Cl.$^7$ .................... H01M 10/50; H01M 6/42
[52] U.S. Cl. ................. 429/62; 429/61; 429/120; 429/231.95; 429/149
[58] Field of Search .................. 429/61, 62, 120, 429/129, 231.95

[56] References Cited

U.S. PATENT DOCUMENTS

| | | | |
|---|---|---|---|
| 5,158,841 | 10/1992 | Mennicke et al. | 429/120 |
| 5,501,916 | 3/1996 | Teramoto et al. | 429/94 |

FOREIGN PATENT DOCUMENTS

| | | |
|---|---|---|
| 43 26 943 A1 | 2/1995 | Germany . |
| 30 00 542 C2 | 1/1996 | Germany . |
| 2 269 476 | 5/1989 | United Kingdom . |

Primary Examiner—Maria Nuzzolillo
Assistant Examiner—Angela J. Martin
Attorney, Agent, or Firm—Schnader Harrison Segal & Lewis LLP

[57] ABSTRACT

A multi-cell storage battery, in particular to a lithium storage battery, which contains a temperature control device and in which groups of one or more individual cells arranged alongside one another are separated from one another by a thermally insulating solid layer whose coefficient of thermal conductivity lies between 0.01 and 0.2 W/(m*K), the thermal resistance of the solid layer being greater by at least a factor $\lambda$ than the thermal resistance of the individual cell. The individual cell is connected, at least in a region free of insulating material, to a heat exchanger, the thermal resistance of the heat exchanger in the direction toward the neighboring cell being selected to be greater by at least a factor $\lambda$ than the thermal resistance of the individual cell and, in addition, the thermal resistance of the heat exchanger toward the temperature control medium being selected to be smaller by at least a factor of about 10 than the thermal resistance of the individual cell, and $\lambda$ being the ratio of the energy content of the individual cell to the amount of energy that is needed to trigger a thermally induced cell failure at a defined upper operating temperature limit.

24 Claims, 2 Drawing Sheets

MULTI-CELL STORAGE BATTERY

STATEMENT REGARDING FEDERALLY SPONSORED RESEARCH OR DEVELOPMENT

The Government of the United States of America has rights in this invention pursuant to Cooperative Agreement No. DE-FC02-91CE50336 awarded by the U.S. Department of Energy.

BACKGROUND OF THE INVENTION

1. Field of the Invention

The present invention relates to multi-cell storage batteries, and, in particular, to lithium storage batteries that have a temperature control device.

2. Description of the Related Art

Multi-cell storage batteries, in particular, batteries that are used for the propulsion of vehicles, for example, and in which charging and discharging continually takes place at high powers, in many cases, have a temperature control device or, in particular, a cooling device. In German patent DE-A-43 26 943, a storage battery is described which is constructed from round cells and whose cells are arranged in a rectangular box. The ends of the cells are freely accessible and air is conducted as a heat transfer medium between the interstitial volumes remaining free between these cells. Furthermore, German patent DE-U 92 10 384 discloses arranging hollow bodies, flowed through by a fluid, between prismatic cells.

It has been shown that cooling arrangements of this type, in particular when cells with a high energy density are used, distribute the energy, which becomes free in the event of the destruction of a cell as a result of misuse or accident, to the entire storage battery, in which case it is not ensured that a thermally induced failure and hence a possible exothermic destruction of further or all the individual cells is avoided.

SUMMARY OF THE INVENTION

The invention is therefore based on the object of specifying a storage battery that is constructed in such a way that, if a critical temperature in an individual cell is exceeded, this heat is not transmitted directly to the neighboring cells, thereby preventing the propagation of thermally induced cell destruction of neighboring cells.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
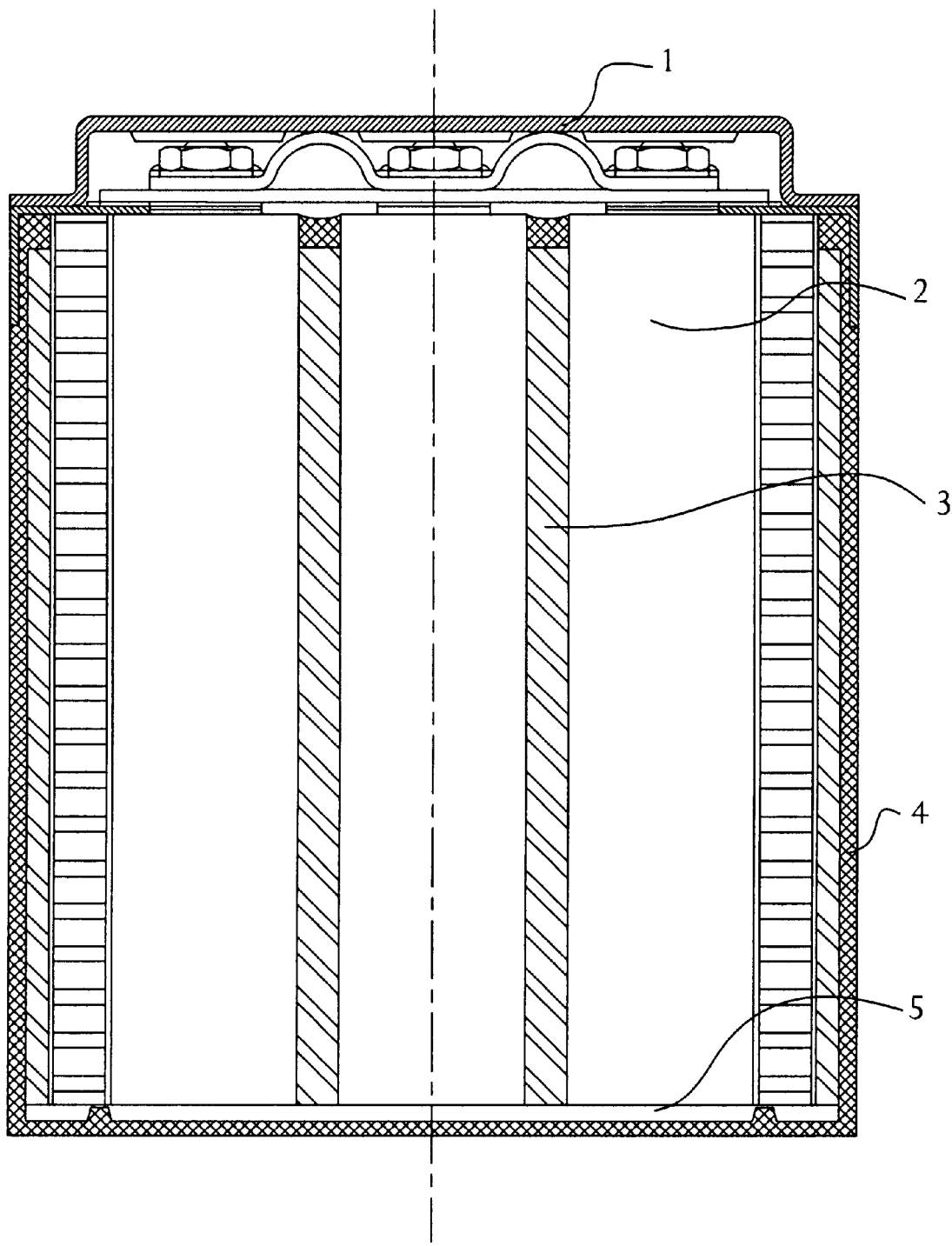
FIG. 1 shows a side cross-section view of a storage battery, according to one embodiment of the invention.

FIG. 1 shows a side cross-section view of a storage battery 1, according to one embodiment of the invention. The invention is based on a multi-cell storage battery in which the individual cells 2 are separated from one another by a thermally insulating solid layer 3. The thermal transfer properties of this solid layer are dimensioned such that, in the event that a cell in the battery assembly reaches a temperature above the critical temperature or exceeds the latter as a result of misuse or accident, the neighboring cells are only gradually simultaneously heated due to the insulating material between the cells, without in the process also being heated to the temperature which is critical for the cells. In this case, the critical temperature is to be understood as that temperature at which spontaneous thermally induced destruction of a cell may occur. This is achieved by selecting the thermal resistance of the insulating layer between the cells to be greater by at least a first factor $\lambda$ than the internal thermal resistance of the individual cell itself.

In order to make temperature control possible, even in the case of mutually insulated cells, a heat exchanger 5 is additionally arranged at one accessible side, not provided with insulating material, of the battery assembly and is dimensioned in such a way that the heat from the cell which has reached or exceeded a critical temperature is easily conducted away through the heat exchanger toward a temperature control medium, while only a low amount of heat flows away to adjacent cells via the heat exchanger. This is achieved by selecting the thermal resistance of the heat exchanger toward the neighboring cell to be greater by at least the factor $\lambda$ than the internal thermal resistance of the individual cell and, moreover, by selecting the thermal resistance of the heat exchanger toward the temperature control medium to be smaller by at least a second factor of about 10 than the internal thermal resistance of the individual cell.

The factor $\lambda$ is a cell constant. It corresponds to the ratio of the energy content of the cell to that amount of energy which is needed to heat a cell to a temperature at which the triggering of a thermally induced cell failure occurs. In this case, a defined upper operating temperature limit of the storage battery is assumed. The defined upper operating temperature limit is, for example in the case of lithium storage batteries with liquid electrolytes, between about 50° C. and about 70° C., and preferably at about 60° C.

Instead of an individual cell, it is of course also possible for a group of two or more cells to occur which are then jointly insulated with respect to another group of individual cells. In this case, the identical boundary conditions with respect to the thermal conductivity of the materials apply in principle.

The insulating layer, according to certain embodiments of the invention, between the cells has a thermal conductivity of about 0.01 to about 0.2 Watts/(meter*degree Kelvin) or W/(m*K). Fundamentally suitable materials are insulating materials that are stable with respect to the temperatures occurring at the destruction of a cell. In particular, it is possible to use asbestos replacement materials, such as are known from the specification of German patent DE 30 00 542, for example.

According to certain embodiments of the invention, the cell assembly is provided with a heat exchanger which, in the simplest case, is a metal plate. If appropriate, the metal plate forms the bottom of a trough surrounding the cells. This metal plate is dimensioned such that, on the one hand, a rapid cooling down of a cell which reaches a critical temperature is possible through the bottom plate toward a temperature control medium with which it is in contact, but, on the other hand, such that the passage cross section through the heat exchanger plate toward the neighboring cell is so small that the propagation of heat to the neighboring cells is considerably blocked.

As already mentioned, the heat exchanger preferably comprises a metal; in particular, iron and sheet steel are suitable for this. In essence, the selection of the material is determined, on the one hand, by the conditions regarding the thermal conductivity and the dimensions, and, on the other hand, by the strength requirements, including those at the temperatures that typically occur during the destruction of cells.

Although air can be used as the temperature control medium, a liquid is preferably used, in particular a water/glycol mixture.

Of course, instead of a metallic plate, a corresponding metallic hollow body can be used, through which the liquid flows. This heat exchanger can be arranged at one or both ends of the cell or cells. In addition to prismatic cells, it is of course also possible to use an arrangement of round cells.

The individual cells, which are thermally decoupled by the insulating layers according to certain embodiments of the invention, should have an energy content of not more than about 1 kilowatt-hour kWh).

Examples of heat-insulating materials that may be used are contained in the following table.

| MATERIAL | TYPICAL THERMAL CONDUCTIVITY |
| --- | --- |
| Glass wool | 0.04 W/(m*K) |
| Microporous mineral fiber | 0.02 W/(m*K) |
| Rock wool | 0.04 W/(m*K) |
| Asbestos boards | 0.14 W/(m*K) |
| SiO$_2$ aerogel | 0.01 W/(m*K) |

Referring again to FIG. 1, the individual cells 2 are arranged with their large surfaces parallel to one another in a battery trough, the bottom of which is formed by a heat exchanger 5. Heat-insulating layers 3 are provided between the individual cells 2, in the case of a plurality of rows of cells between the rows, and in relation to the vertical walls of the battery trough 4. The heat-insulating layers 3 that surround the individual cells 2 toward the battery trough 4 are only half as thick as the heat-insulating layer 3 between the cells 2, so that the necessary complete thickness of the heat-insulating layer 3 is also ensured with respect to a directly adjacent, constructionally identical battery trough 4. In other words, the heat-insulating layers 3 of the mutually adjoining battery troughs 4 complement one another to be equal to the heat-insulating layer thickness between the cells 2.

Figure 2A:
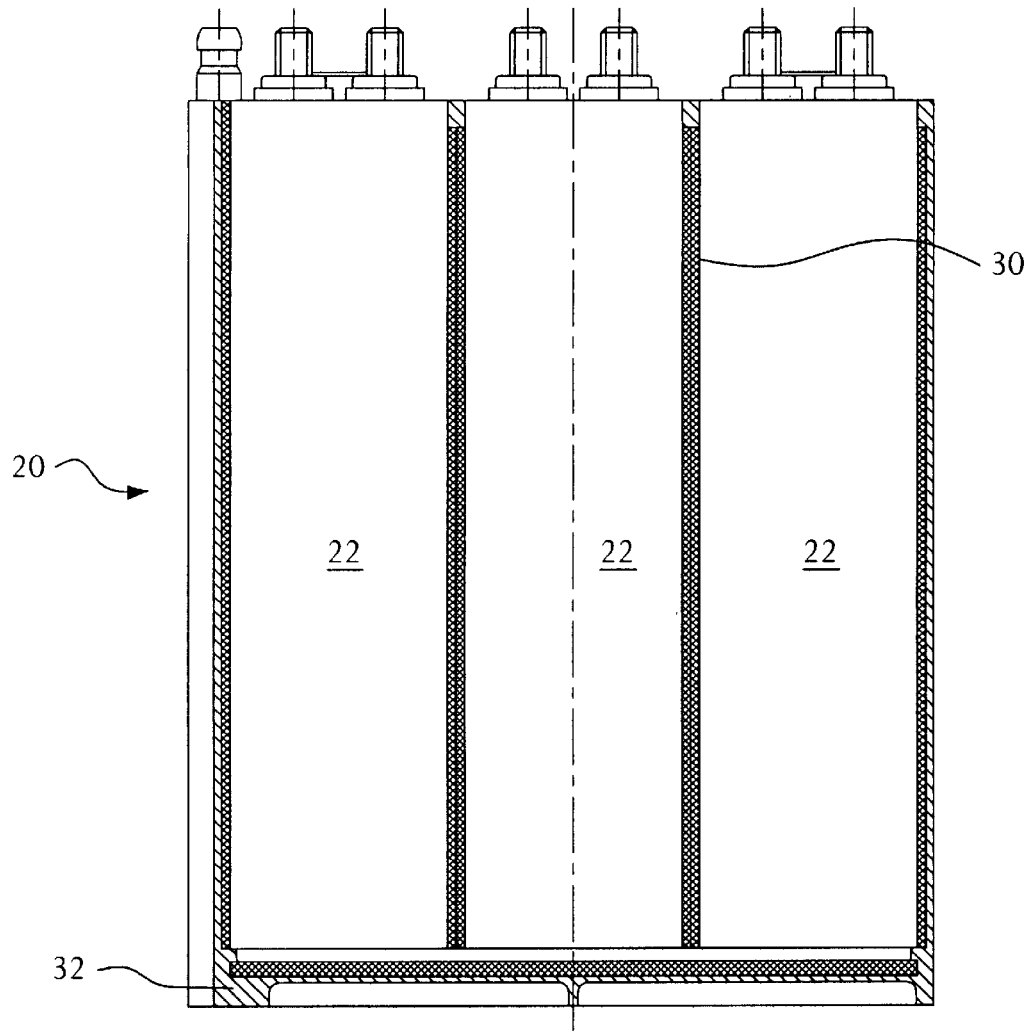
FIGS. 2A and 2B show side and top views, respectively, of a storage battery, according to another embodiment of the invention.
Figure 2B:
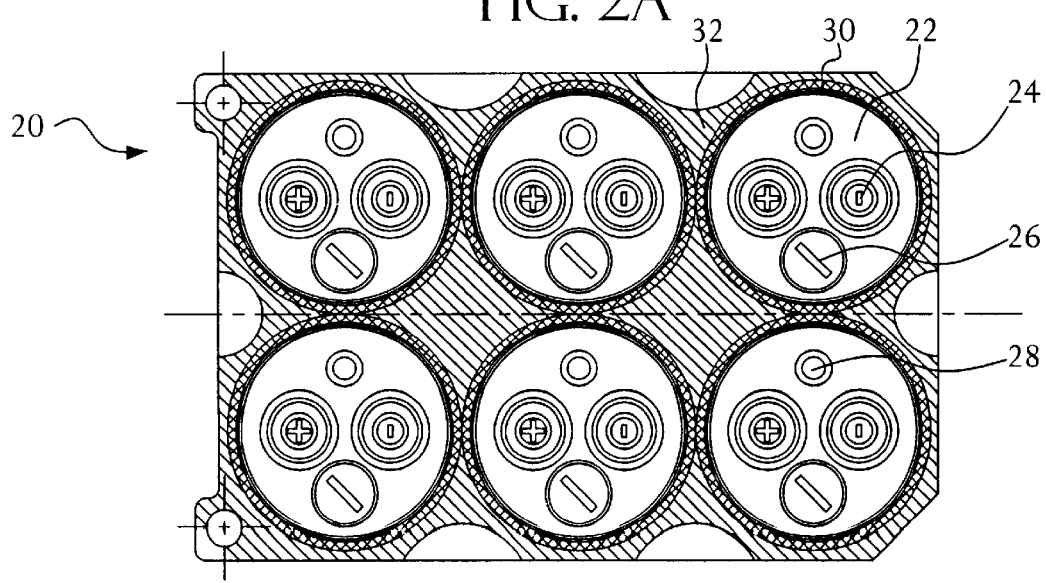

FIGS. 2A and 2B show side and top views, respectively, of a storage battery 20, according to another embodiment of the invention. Storage battery 20 has six cylindrical cells 22, each having two cell poles 24, a fill opening 26, and rupture membrane 28. Surrounding each cell 22 is a heat-insulating layer 30 which provides thermal isolation between the cells. The heat-insulating material 30 can, but need not fill all of the interstitial space between cells. For example, in the embodiment of FIG. 2B, a carrier material 32 fills the interstitial space outside of the heat-insulating layers 30.

EXAMPLE 1

A lithium ion storage battery comprising 10 prismatic cells with the dimensions about 30×210×180 mm is arranged in a battery trough in such a way that the 10 cells are arranged in a row with their large sides abutting one another. There is a heat-insulating layer between the individual cells. The cells have a nominal capacity of about 60 amp-hours (Ah) and a specific energy of about 120 watt-hours/kilogram (Wh/kg). Their specific heat capacity is about 0.28 watt-hours/(kilogram*degree Kelvin) (Wh/(kg*K)). They are operated up to an upper operating temperature limit of about 60° C. The critical temperature is about 150° C., so that, in order to destroy a cell that finds itself at the upper operating temperature, an energy of about 25.2 Wh/kg is necessary (assuming homogeneous heating). Hence, the characteristic X is approximately equal to (120 wh/kg÷25.2 wh/kg)=4.8.

The cells, whose thermal conductivity in the direction of the neighboring cell is about 0.5 W/(m*K), are thermally insulated from one another, according to certain embodiments of the invention, using microporous mineral fiber layers having a thermal conductivity of about 0.02 W/(m*K) (e.g., MIKROTHERM® brand microporous mineral fiber layers produced by Micropore International Ltd., Troitwich, United Kingdom), which are about 7 mm thick. In relation to the large side face of the cells, this solid layer has a thermal resistance of about 9.3 K/W. The thermal resistance of an individual cell is about 1.6 K/W, so that the insulating layer has more than λ times the thermal resistance.

Located on the vertical outer sides of the storage battery are heat-insulating layers having half the thickness of about 3.5 mm, composed of the same material, so that the cells of adjacent storage batteries are also appropriately thermally insulated from one another.

In addition, all the cells of the storage battery stand on a heat exchanger made of stainless steel and having a thermal conductivity of about 15 W/(m*K), which has a wall thickness of about 0.5 mm and through which a water/glycol mixture flows. The thermal resistance for the thermal transfer through the cooler wall from one cell to the next is about 11.7 K/W and is hence more than λ times higher than the internal thermal resistance, whereas the thermal resistance for the heat transfer through the cooler wall to the coolant, at about $5*10^{-3}$ K/W, is more than 10 times smaller than the internal thermal resistance of the individual cell.

EXAMPLE 2

In a lithium ion storage battery, comprising a number of 60-Ah cells having the properties mentioned in Example 1, the cells are combined into groups of, for example, 3 individual cells. Between the individual cells of a group, which has an energy content of about 0.7 kWh, there is no heat-insulating material. The cell groups are insulated from one another using an insulating material layer comprising MIKROTHERM® brand microporous mineral fiber layers. The thickness of the insulating material layer is about 10 mm. The cells are arranged upright on a sheet metal bottom which itself has no heat-exchanger function, but which makes heat-conducting contact possible at the bottom of the battery casing.

EXAMPLE 3

In a lithium ion storage battery, comprising horizontally arranged round cells having an energy content of about 0.25 kWh, the individual cells are continuously surrounded on their outer surface by a heat-insulating material that fills up the cell interstitial spaces, the shortest radial distance from cell casing to cell casing being about 3 mm. The cell bottoms, which all point to the same side of the battery, are coupled to a vertical heat exchanger. The pole bushings of the round cells and the electric cell connectors which are placed thereon are located on the opposite side.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A battery having a plurality of individual storage cells and a temperature control device, wherein:
the individual cells are arranged into two or more groups of cells, each group having one or more individual cells arranged alongside one another and separated from one another by a cell space filled with a thermally insulating solid material;
the groups of one or more cells are separated from one another by a space, said space being filled with a thermally insulating solid material, the thermal resistance of the solid material being greater by at least a first factor than the thermal resistance of each cell; and
each group of one or more cells is thermally connected to a heat exchanger having a temperature control medium, wherein:
the thermal resistance of the heat exchanger in a direction toward a neighboring group of one or more cells is selected to be greater by at least the first factor than the thermal resistance of each cell; and
the thermal resistance of the heat exchanger in a direction toward the temperature control medium is selected to be smaller by at least a second factor then the thermal resistance of each cell.

2. The battery of claim 1, wherein:
the coefficient of thermal conductivity of the thermally insulating solid material lies between about 0.01 and about 0.2 W/(m*K);
the first factor is approximately equal to the ratio of the energy content of a group of cells to the amount of energy which is needed to trigger a thermally induced cell failure at a defined upper operating temperature limit; and
the second factor is the ratio of the thermal resistance of each cell to the thermal resistance of the heat exchanger in a direction toward the temperature control medium.

3. The battery of claim 1, wherein an insulating material of a microporous mineral fiber layer is arranged between each neighboring group of one or more cells.

4. The battery of claim 1, wherein the defined upper operating temperature limit is between about 50° C. and about 70° C.

5. The battery of claim 4, wherein the defined upper operating temperature limit is about 60° C.

6. The battery of claim 4, wherein the battery is a lithium storage battery with a liquid electrolyte.

7. The battery of claim 1, wherein the maximum energy content of each group of one or more cells is less than about 1 kWh.

8. The battery of claim 1, wherein the heat exchanger comprises a metal plate adjacent to one end of each group of one or more cells.

9. The battery of claim 1, wherein the heat exchanger comprises a hollow metal body through which cooling liquid flows.

10. The battery of claim 1, further comprising an outer thermally insulated solid material between the outer wall of the battery and an adjacent group of one or more cells, wherein the thermal resistance of the outer thermally insulating solid material is about half of the thermal resistance of the thermally insulated solid material between adjacent groups of one or more cells, such that, when two or more batteries are placed side by side, the thermal resistance between two groups of one or more cells from different batteries is approximately equal to the thermal resistance between two groups of one or more cells from a single battery.

11. The battery of claim 1, wherein:
the battery is a lithium storage battery with a liquid electrolyte;
the coefficient of thermal conductivity of the thermally insulating solid material lies between about 0.01 and about 0.2 W/(m*K);
the first factor is approximately equal to the ratio of the energy content of a group of one or more cells to the amount of energy which is needed to trigger a thermally induced cell failure at a defined upper operating temperature limit;
the second factor is the ratio of the thermal resistance of each cell to the thermal resistance of the heat exchanger in a direction toward the temperature control medium;
an insulating material of a microporous mineral fiber layer is arranged between each neighboring group of one or more cells;
the defined upper operating temperature limit is between about 50° C. and about 70° C.;
the maximum energy content of each group of one or more cells is less than about 1 kWh;
the heat exchanger comprises a metal plate adjacent to one end of each group of one or more cells and a hollow metal body through which cooling liquid flows; and
further comprising an outer thermally insulated solid material between the outer wall of the battery and an adjacent group of one or more cells, wherein the thermal resistance of the outer thermally insulating solid material is about half of the thermal resistance of the thermally insulated solid material between adjacent groups of one or more cells, such that, when two or more batteries are placed side by side, the thermal resistance between two groups of one or more cells from different batteries is approximately equal to the thermal resistance between two groups of one or more cells from a single battery.

12. The battery of claim 11, wherein the defined upper operating temperature limit is about 60° C.

13. The battery of claim 1, wherein the second factor is about 10.

14. The battery of claim 11, wherein the second factor is about 10.

15. A battery having a plurality of individual storage cells and a temperature control device, wherein:
the individual cells are arranged into two or more groups of cells, each group having one or more individual cells arranged alongside one another and separated from one another by a cell space filled with a thermally insulating solid material;
the groups of one or more cells are separated from one another by a space, said space containing a thermally insulating solid material, the thermal resistance of the solid material being greater by at least a first factor than the thermal resistance of each cell, any space remaining between groups of cells being filled with a solid carrier material; and
each group of one or more cells is thermally connected to a heat exchanger having a temperature control medium, wherein;
the thermal resistance of the heat exchanger in a direction toward a neighboring group of one or more cells is selected to be greater by at least a first factor than the thermal resistance of each cell; and the thermal resistance of the heat exchanger in a direction toward the temperature control medium is selected to be smaller by at least a second factor than the thermal resistance of each cell.

16. The battery of claim 15, wherein:

the coefficient of thermal conductivity of the thermally insulating solid material lies between about 0.01 and about 0.2 W/(m*K);

the first factor is approximately equal to the ratio of the energy content of a group of cells to the amount of energy which is needed to trigger a thermally induced cell failure at a defined upper operating temperature limit; and the second factor is the ratio of the thermal resistance of each cell to the thermal resistance of the heat exchanger in a direction toward the temperature control medium.

17. The battery of claim 15, wherein an insulating material of a microporous mineral fiber layer is arranged between each neighboring group of one or more cells.

18. The battery of claim 15, wherein the defined upper operating temperature limit is between about 50° C. and about 70° C.

19. The battery of claim 18, wherein the defined upper operating temperature limit is about 60° C.

20. The battery of claim 18, wherein the battery is a lithium storage battery with a liquid electrolyte.

21. The battery of claim 15, wherein the maximum energy content of each group of one or more cells is less than about 1 kWh.

22. The battery of claim 15, wherein the heat exchanger comprises a metal plate adjacent to one end of each group of one or more cells.

23. The battery of claim 15, wherein the heat exchanger comprises a hollow metal body through which cooling liquid flows.

24. The battery of claim 15, wherein the second factor is about 10.

* * * * *